United States Patent [19]
Hoyler

[11] 3,840,737
[45] Oct. 8, 1974

[54] METHOD AND APPARATUS FOR DETERMINING DIRECTION OF OPERATION IN A VEHICLE CONTROL SYSTEM

[75] Inventor: Robert C. Hoyler, Pittsburgh, Pa.

[73] Assignee: Westinghouse Electric Corporation, Pittsburgh, Pa.

[22] Filed: July 6, 1973

[21] Appl. No.: 376,976

[52] U.S. Cl.................. 246/63 R, 105/61, 318/257
[51] Int. Cl............................................... B61l 3/18
[58] Field of Search .......... 318/256, 257, 283, 284, 318/285, 286; 105/61; 246/63 C, 63 R, 187 B

[56] References Cited
UNITED STATES PATENTS

| | | | |
|---|---|---|---|
| 1,720,225 | 7/1929 | Lewis | 246/63 C |
| 2,269,239 | 1/1942 | Allison | 246/63 C |
| 3,140,068 | 7/1964 | Matthews | 318/257 |
| 3,144,598 | 8/1964 | Merritt | 318/257 |
| 3,526,378 | 9/1970 | Thorne-Booth | 246/34 CT |
| 3,698,325 | 10/1972 | Grundy | 105/61 |

Primary Examiner—M. Henson Wood, Jr.
Assistant Examiner—George H. Libman
Attorney, Agent, or Firm—J. M. Arnold

[57] ABSTRACT

A vehicle travel path is divided into a plurality of vehicle control blocks such as track circuit signal blocks. In a given track circuit signal block, a first vehicle speed command signal is introduced into one end thereof, and a second vehicle speed command signal is introduced in the other end thereof. A vehicle travels along the vehicle travel path, and carries signal sensing apparatus on each end of the vehicle for sensing the respective vehicle speed command signals. In response to sensing the non-zero speed command signal from the one end, and a zero speed command signal from the other end of a given track circuit block, the vehicle is commanded to travel toward the one end. In response to sensing a zero speed command signal from the one end, and a non-zero speed command signal from the other end, the vehicle is commanded to travel toward the other end of said given track circuit block.

7 Claims, 4 Drawing Figures

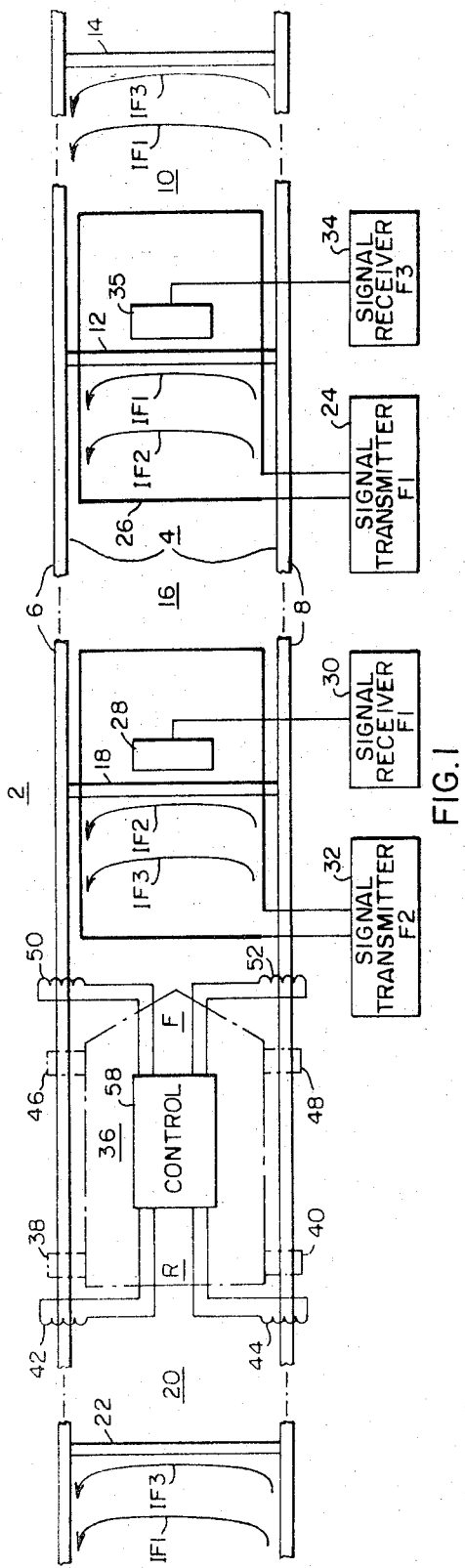
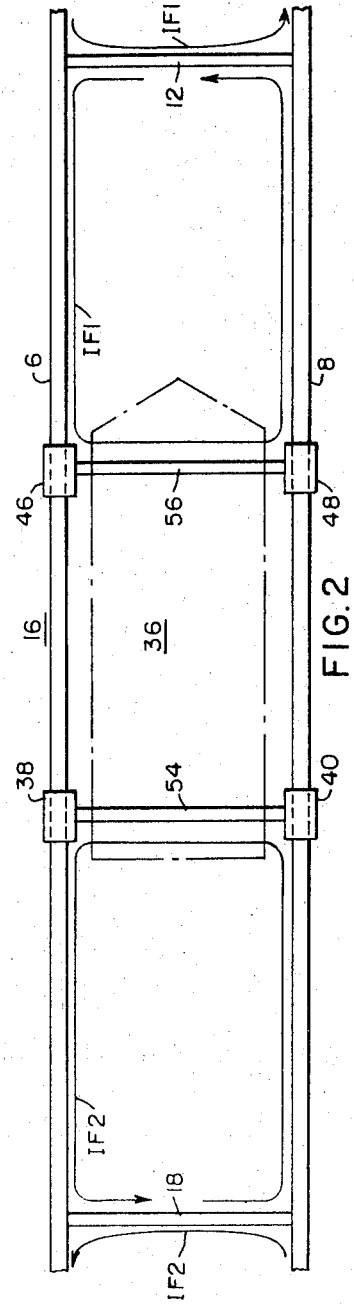
FIG.1
FIG.2

METHOD AND APPARATUS FOR DETERMINING DIRECTION OF OPERATION IN A VEHICLE CONTROL SYSTEM

CROSS REFERENCE TO RELATED APPLICATIONS

Reference is made to U.S. Pat. No. 3,593,022, entitled "Control Of A Vehicle Along A Path Divided Into A Plurality Of Signal Blocks," filed Sept. 25, 1968 on behalf of Robert C. Hoyler, et al, and to U.S. reissue Pat. No. RE. 27,472, entitled "Signal System For Determining The Presence Of A Train Vehicle," which is the reissue of U.S. Pat. No. 3,526,378, entitled "Signal System For Determining The Presence Of A Train Vehicle," filed Aug. 23, 1967 on behalf of George M. Thorne-Booth. Each of the above named U.S. Patents is assigned to the assignee of the present invention.

BACKGROUND OF THE INVENTION

Many present day modern steel-wheel, steel-rail rapid transit systems operate automatically with respect to detection, speed control, station stopping, door control, route requests, central supervision and the like. In many such systems however an on-board attendant is needed to determine the direction in which the train is to run. The attendant activates a key switch or similar apparatus on one end or the other of the vehicle for the purpose of connecting a signal receiving antenna at one end or the other of the vehicle, energizing control equipment, and operating the reverser in the propulsion equipment. Each time the vehicle is to change its direction of travel, this necessitates the attendant operating the switch such that the proper equipment on the vehicle may be energized. This clearly is not a completely automatic mode of operation.

According to the present invention, a system for determining the direction of travel of a vehicle is disclosed which automatically controls the direction of travel of the vehicle without the intervention of an on-board attendant. The invention disclosed, may be practiced in vehicle control systems other than those utilizing steel-wheels and steel-rails. For example, the principles set forth may be utilized in rubber tire systems, in cushion systems, magnetic suspension systems and the like.

SUMMARY OF THE INVENTION

A vehicle control system for controlling at least one vehicle is disclosed, wherein the system comprises a vehicle travel path which is divided into a plurality of signal conductive vehicle control blocks. There are means for introducing a first vehicle speed command signal, which may have a zero speed or non-zero speed value, into one end of a given vehicle control block. Also included, are means for introducing a second vehicle speed command signal, which may have a zero speed or non-zero speed value, into the other end of the given vehicle control block. Further included, are means responsive to one of the one vehicle sensing the first vehicle speed command signal having a non-zero speed value and the second vehicle speed command signal having a zero speed value for permitting the vehicle to travel toward the one end of the given vehicle control block, and the one vehicle sensing the first vehicle speed command signal having a zero speed value and the second vehicle speed command signal having a non-zero speed value for permitting the one vehicle to travel toward the other end of the given vehicle control block.

DESCRIPTION OF THE DRAWINGS

FIG. 1 is a schematic and block diagram representation of a vehicle operational on a vehicle travel path which is divided into a plurality of vehicle control blocks;

FIG. 2 is a schematic diagram representation of a given vehicle control block, illustrating the current flow through the axles of a vehicle present within the given vehicle control blocks;

DESCRIPTION OF THE PREFERRED EMBODIMENTS

Figure 3:
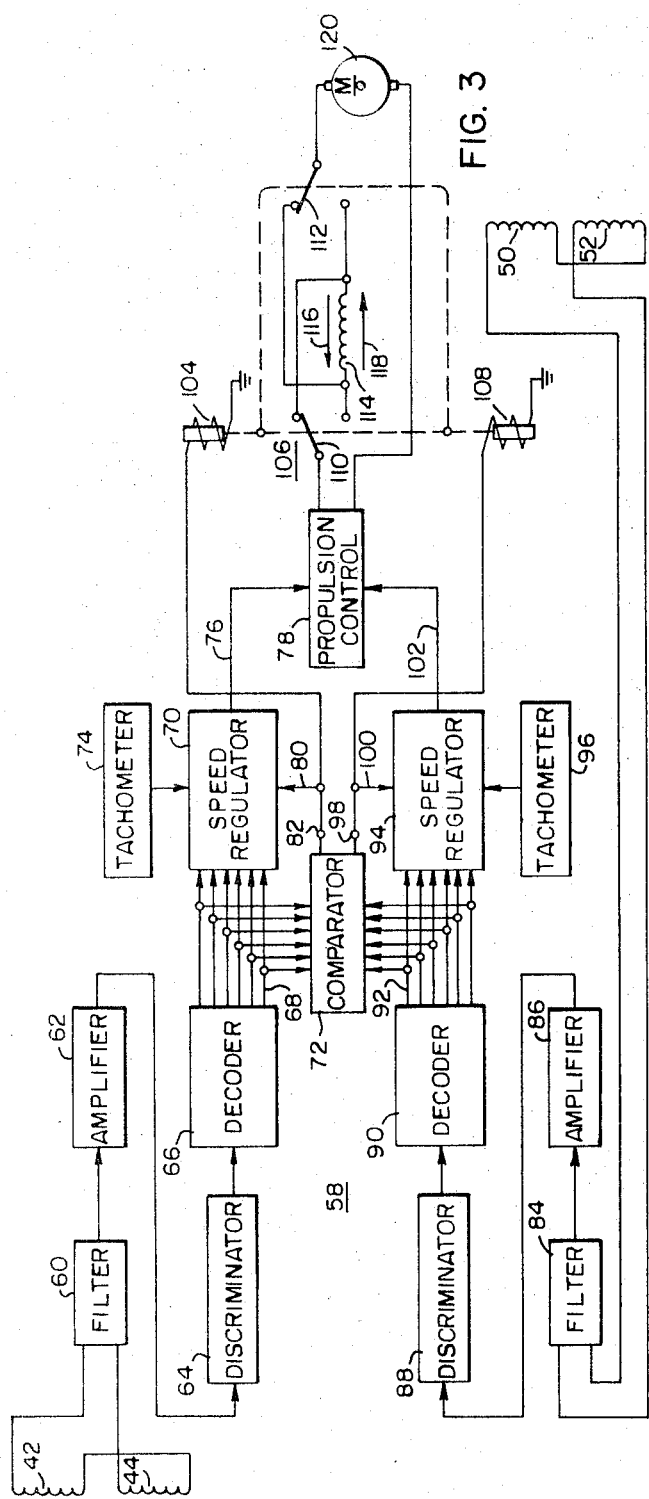
FIG. 3 is a schematic and block diagram representation of a direction control system according to the present invention.

FIG. 1 illustrates a vehicle control system 2 which includes a vehicle travel path such as the track 4 which is comprised of a pair of continuous conductive rails 6 and 8. A plurality of conductors are connected between the rails at predetermined locations for providing respective signal conductive paths between the rails. The conductors, for example, may be made of copper rods or the like. The track section between and including two such conductors defines a signal conductive vehicle control block such as a signal conductive track circuit block. A track circuit block 10 is comprised of the track section between and including the conductors 12 and 14. A signal conductive track circuit block 16 is comprised of the track section between and including conductors 12 and 18. A track circuit block 20 is comprised of the track section between and including conductors 18 and 22.

Speed command signals for vehicles within a given track circuit block are transmitted from the track wayside and are induced into the rails such that a vehicle traversing the vehicle travel path may sense the vehicle speed command signals such that the vehicle travels in a direction and at a rate of speed in accordance with the respective speed command signals. A signal transmitter 24 transmits a coded vehicle speed command signal having a carrier frequency F1. This signal is coupled to an antenna 26 which has two legs thereof placed adjacent to and substantially parallel with the rails 6 and 8. The remaining two legs of the antenna are placed substantially perpendicular to the rails and are spaced substantially equidistance from the conductor 12. The signal transmitted from the antenna 26 is induced into track circuit signal blocks 10 and 16 such that a vehicle may be controlled to travel in either direction along the vehicle travel path. The wayside equipment, including transmitter 24, is programmed such that a vehicle is commanded to travel in one direction or the other at a given time. This is to be explained in more detail shortly.

In a system in which a vehicle is to travel from left to right as illustrated in FIG. 1, a signal receiver 30 tuned to a frequency F1 is connected to a signal coupling device such as a transformer 28 which may be physically mounted on the conductor 18. In the absence of a vehicle in the track circuit block 16 the current IF1, induced in response to the provision of the signal at frequency F1, flows in the loop forming the track circuit block 16 and induces a signal into transformer 28 such that a signal is coupled to the signal receiver 30 which is indicative of a vehicle not being present in the track circuit block 16. Conversely, if a vehicle is present, the signal is shorted out, as is to be explained shortly. A vehicle speed command from the signal transmitter 32, which transmits a vehicle speed command at a carrier frequency F2, is also flowing in the track circuit signal block 16 at this time. This latter signal is not sensed by the signal receiver 30 since the currents due to the signal at a frequency F2 are in a series opposing relationship in conductor 18, and further the signal receiver 30 is tuned to be receptive only to a signal having a carrier frequency F1. A signal receiver 34 is connected to a transformer 35 for sensing a speed command signal at a carrier frequency F3 which is induced in the track circuit signal block 10 by a signal transmitter (not shown) which is operative with the conductor 14 for inducing a vehicle speed command having a carrier frequency F3 into track circuit block 10 and the track circuit block (not shown) to the right of the conductor 14. The track circuit block 20 has a vehicle speed command having a carrier frequency F2 induced therein by the signal transmitter 32 and a vehicle speed command having a carrier frequency F3 induced by a signal transmitter (not shown) operative with the conductor 22.

As has been described above, there is a first vehicle speed command induced into one end of a given track circuit block, and a second vehicle speed command signal induced into the other end of the given track circuit signal block. The vehicle control system which has been briefly described is disclosed in detail in the previously referenced U.S. reissue Pat. No. Re. 27,472. The details of the speed coding signal multiplexing and general system operation is set forth in the previously referenced U.S. Pat. No. 3,593,022.

When a vehicle, such as the vehicle 36, is within a given track circuit signal block the steel wheels and steel axle of the vehicle short out the vehicle speed command flowing in the given track circuit block. That is, in the track circuit signal block 20 illustrated the current IF3 flowing therein is shorted out by the axle (not shown) connected to the wheels 38 and 40 such that this current flows through the conductor 22 through the latter axle and back to the conductor 22. The antennas 42 and 44 however sense the vehicle speed command having the carrier frequency F3. The vehicle speed command having a carrier frequency F2 induced in the other end of the track circuit signal block 20 flows in the loop formed by the conductor 18 and the axle (not shown) connected to the wheels 46 and 48. The antennas 50 and 52 however sense the vehicle speed command having the carrier frequency F2. The signal receiver (not shown) tuned to the frequency F2 and operative with the conductor 22 senses the absence of the current flow at the frequency F2 which is indicative of the vehicle 36 being within the vehicle control block 20. Accordingly, a zero speed command signal having a carrier frequency F3 is transmitted to the track circuit signal block to the left of track circuit block 20.

The manner in which the steel wheels and axles of the vehicle short out the two vehicles speed commands in a given track circuit block is illustrated in more detail in FIG. 2, where a given track circuit block such as track circuit block 16 is illustrated. As is seen, the current IF2 is shorted by the axle 54 connected to the wheels 38 and 40, and the current IF1 is shorted by the axle 56 connected to the wheels 46 and 48. At this time there is a negligible amount of signal current flowing in the rail 6 between the wheels 38 and 46, as well as in the rail 8 between the wheel 40 and 48, due to the axles shorting the current. Since the current IF1 is shorted by the axle 56 the signal receiver 30 (see FIG. 1) senses the absence of a signal in the track circuit block 16 and the signal transmitter 32 (see FIG. 1) transmits a zero speed command signal having a carrier frequency F2 to the track circuit block 20 in order to prevent a following vehicle from colliding with the vehicle in block 16. This zero speed command signal is also coupled to the track circuit block 16 and is manifested as the signal IF2 which is shorted by the axle 54. The antennas 42 and 44 (see FIG. 1) sense this zero speed command signal. The signal transmitted by the signal transmitter 24 (see FIG. 1), in the absence of a vehicle within the vehicle control block 10 is a non-zero speed command and this signal is sensed by the antennas 50 and 52, and is manifested as the signal IF1. The signals sensed by the antennas at each end of the vehicle are coupled to a control unit 58 (FIG. 1) on the vehicle 36, which control unit responds to the zero speed command sensed at one end of the vehicle and the non-zero speed command sensed at the other end of the vehicle such that the vehicle is permitted to travel towards the end of the track circuit signal block which has the non-zero speed command signal induced therein. This is to be described in more detail shortly.

FIG. 3 is a block diagram representation of the control unit 58 in the vehicle 6. The control unit 58 functions to detect the first and second vehicle speed command signals induced into the opposite ends of a given track circuit block to command the vehicle to travel towards the end of the track circuit block in which the non-zero speed command signal is induced. Assume that the vehicle 36 is physically present in a given track circuit signal block such as the track circuit signal block 16 as illustrated in FIG. 2. As was previously explained, the antennas 42 and 44 sense a coded vehicle speed command which has a zero speed value. This command may be frequency coded, such that a binary one signal is represented by a first frequency and a binary zero signal is represented by a second frequency. This signal is coupled to a bandpass filter circuit 60 and the latter signal is amplified by an amplifier 62 and coupled to a discriminator circuit 64 which responds to the respective frequencies indicative of a binary 1 and binary 0 and provides a coded digital signal output to a decoder 66. The decoder 66 has a plurality of signal output lines each one of which is indicative of a distinct speed command signal. For example, at a given time, a zero speed command signal may be present on the line 68, or one of a plurality of non-zero speed command signals may be present on the remaining ouput signal lines. In this instance, a zero speed signal is present. The signal present is coupled to a speed regulator 70 and a signal comparator 72. The speed regulator 70 also has a signal input from a tachometer 74. The speed regulator 70 operates in a well known manner to compare actual speed of the vehicle, as indicated by the signal output from the tachometer, with the desired vehicle speed, as indicated on one of the lines from decoder 66, to provide a signal output on a line 76 to a propulsion control unit 78. The control unit 78 applies current to the vehicle drive motor at a value such that the vehicle travels at the speed desired. The speed regulator 70 also is provided a gating signal by way of a line 80 from the output terminal 82 from the comparator 72. This gating signal permits the speed regulator 70 to provide an output signal only when the antennas 42 and 44 sense a signal having a non-zero speed value concurrent with the antennas 50 and 52 sensing a vehicle speed signal having a zero speed value.

The antennas 50 and 52, as previously explained, are at this time sensing a vehicle speed command signal having a non-zero speed value. This signal is passed by a bandpass filter 84 and is amplified by an amplifier 86 which couples the speed signal to a discriminator 88 which responds to the respective binary one and zero frequencies to provide a coded digital vehicle speed command signal to a decoder 90 which provides either a zero speed signal on a line 92 or one of a plurality of the non-zero speed signals on the remaining output lines. In this instance a non-zero signal is present. The vehicle speed command signal present is coupled to the comparator 72 as well as to a speed regulator 94 which also receives a signal input from a tachometer 96 and a gating signal from the output terminal 98 of the comparator 72 by way of a line 100. The speed regulator 94 functions in a manner similar to the speed regulator 70 to provide a signal proportional to the desired speed of the vehicle by way of a line 102 to the propulsion control unit 78 whenever the antennas 50 and 52 sense a vehicle speed command signal having a non-zero speed value concurrent with the antennas 42 and 44 sensing a vehicle speed command signal having a zero speed value. Whenever this occurs a gating signal is provided at the output terminal 98 which allows the speed regulator 94 to provide a speed signal to propulsion control unit 78.

The gating signal appearing at the output terminal 82 is coupled to a first coil 104 of a bistable relay 106 for setting the relay 106 to a first bistable state whenever a control signal is present at the output terminal 82 which is indicative of the antennas 42 and 44 sensing a non-zero speed value signal and the antennas 50 and 52 sensing a zero value speed signal. The output terminal 98 is connected to a second coil 108 of the bistable relay 106 which coil is energized setting the relay 106 to a second bistable state whenever a control signal is present at the terminal 98 which is indicative of the antennas 50 and 52 sensing a non-zero value speed signal concurrent with the antennas 42 and 44 sensing a zero value vehicle speed signal. Assume that a control signal is present at the terminal 82 and the coil 104 is energized such that bistable relay 106 is in the first bistable state. The contacts 110 and 112 of the relay are therefore in the position indicated and current flows through the field winding 114 in a direction as illustrated by the arrow 116, driving the vehicle drive motor 120 in a first direction. When the relay 106 is switched to a second bistable state in response to the provision of a control signal at the terminal 98 the relay contacts 110 and 112 are pulled downward and current flows through the field winding 114 in a direction as illustrated by the arrow 118 driving the vehicle drive motor 120 in the opposite direction.

Figure 4:
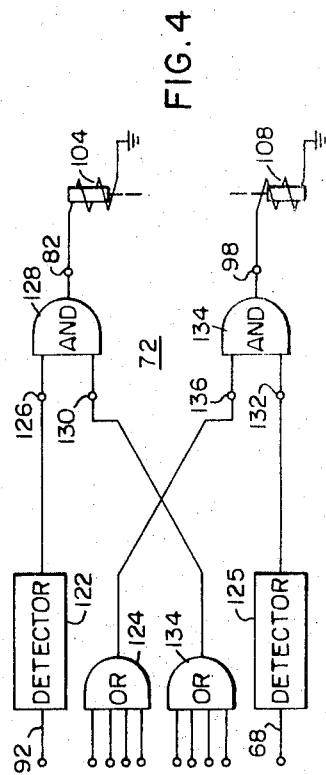
FIG. 4 is a schematic diagram representation of the comparator illustrated in FIG. 3.

FIG. 4 illustrates one embodiment suitable for the comparator 72 illustrated in FIG. 3. The zero speed line 92 from decoder 90 is connected to a detector 122 which provides a signal output only in response to sensing the binary code indicative of zero speed command signal. The remaining output lines from the decoder 90, each of which is a different non-zero speed command, are connected to the respective inputs of an OR gate 124. The zero speed command line 68 from decoder 66 is coupled to the input of a detector 125 which provides a signal output only in response to the sensing of the binary code indicative of a zero speed command signal. The remaining output lines from the decoder 66, each of which is a different non-zero speed command, are connected to the respective inputs of an OR gate 134. The outputs of the detector 122 and gate 134 are applied to the input terminals 126 and 130, respectively of an AND gate 128, and the outputs of the detector 125 and gate 124 are applied to the input terminals 132 and 136, respectively, of an AND gate 134. It is seen that the gate 128 provides a signal output only in response to the sensing of a zero speed command signal by the detector 122 concurrent with one of the plurality of non-zero speed command signal outputs from the OR gate 134. In response to the latter condition a signal output is provided at the terminal 82 which is applied to the coil 104 of the relay 106 for setting the relay to the first bistable state. It is also seen, that the AND gate 134 provides a signal output only in response to the detector 125 sensing a zero speed command signal concurrent with the OR gate 124 sensing one of the plurality of non-zero speed command signals. In response to the latter condition a control signal is provided at the output terminal 98 which is applied to the coil 108 of the bistable relay 106 for setting the relay to the second bistable state.

In summary, a method and apparatus has been disclosed for determining the direction of operation of a vehicle. When a vehicle in a given track circuit block senses a non-zero vehicle speed command signal being induced into one end of the track circuit block, and a zero speed signal being induced into the other end of the track circuit block, the vehicle is commanded to travel toward the one end of the given track circuit block.

What I claim is:

1. In a vehicle control system for controlling at least one vehicle traveling over a vehicle travel path which is divided into a plurality of signal conductive vehicle control blocks, the combination comprising:

means for introducing a first vehicle speed command signal, which may have a zero speed or non-zero speed value, into one end of a given vehicle control block;

means for introducing a second vehicle speed command signal, which may have a zero speed or non-zero speed value, into the other end of said given vehicle control block; and means responsive to one of said one vehicle sensing said first vehicle speed command signal having a non-zero speed value and said second vehicle speed command signal having a zero speed value for automatically permitting said one vehicle to travel toward said one end of said given vehicle control block, and said one vehicle sensing said first vehicle speed command signal having a zero speed value and said second vehicle speed command signal having a non-zero speed value for automatically permitting said one vehicle to travel toward said other end of said given vehicle control block.

2. In a vehicle control system for controlling at least one vehicle, said system having a conductive track including a pair of conductive rails, with said track being divided into a plurality of signal conductive track circuit blocks, the combination comprising:

means for introducing a first vehicle speed command signal, which may have a zero speed or non-zero speed value, into the rails at one end of a given track circuit block;

means for introducing a second vehicle speed command signal, which may have a zero speed or non-zero speed value, into the rails at the other end of said given track circuit block; and means responsive to one of said one vehicle sensing said first vehicle speed command signal having a non-zero speed value and said second vehicle speed command signal having a zero speed value for automatically permitting said one vehicle to travel toward said one end of said given track circuit block, and said one vehicle sensing said first vehicle speed command signal having a zero speed value and said second vehicle speed command signal having a non-zero speed value for automatically permitting said one vehicle to travel toward said other end of said given track circuit block.

3. In a vehicle control system for controlling at least one vehicle, said system having a conductive track including a pair of conductive rails, with said track being divided into a plurality of signal conductive track circuit blocks, the combination comprising:

means for introducing a first vehicle speed command signal, which may have a zero speed or non-zero speed value, into the rails at one end of a given track circuit block;

means for introducing a second vehicle speed command signal, which may have a zero speed or non-zero speed value, into the rails at the other end of said given end of said given track circuit block;

a first signal responsive means for sensing said first vehicle speed command signal when said one vehicle is oriented in a first direction, and for sensing said second vehicle speed command signal when said one vehicle is oriented in a second direction;

a second signal responsive means for sensing said second vehicle speed command signal when said one vehicle is oriented in said first direction, and for sensing said first vehicle speed command signal when said one vehicle is oriented in said second direction; and means responsive to one of said first and second signal responsive means sensing said first vehicle speed command signal having a non-zero speed value and the remaining one of said first and second signal responsive means sensing said second vehicle speed command signal having a zero speed value for automatically permitting said one vehicle to travel toward said one end of said given track circuit block, and also being responsive to one of said first and second signal responsive means sensing said first vehicle speed command signal having a zero speed value and the remaining one of said first and second signal responsive means sensing said second vehicle speed command signal having a non-zero speed value for automatically permitting said one vehicle to travel toward said other end of said given track circuit block.

4. In a vehicle control system for controlling at least one vehicle, said system having a conductive track including a pair of conductive rails, with a plurality of conductors connected between said rails at predetermined locations for providing respective signal conduction paths between said rails, with the track section between and including two such conductors defining a signal conductive track circuit block, the combination comprising:

means for introducing a coded first vehicle speed command signal, which may have a zero speed or a non-zero value, into the rails at one end of a given track circuit block;

means for introducing a coded second vehicle speed command signal, which may have a zero speed or a non-zero speed value, into the rails at the other end of said given track circuit block;

a first signal responsive means mounted on one end of said one vehicle for sensing said coded first vehicle speed command signal when said one vehicle is oriented in one direction on said tracks, and for sensing said coded second vehicle speed command signal when said one vehicle is oriented in the opposite direction on said tracks;

a second signal responsive means mounted on the other end of said one vehicle for sensing said coded second vehicle speed command signal when said one vehicle is oriented in one direction on said tracks, and for sensing said coded first vehicle speed command signal when said one vehicle is oriented in the opposite direction on said tracks;

a first decoder for decoding the coded vehicle speed command signal sensed by said first signal responsive means;

a second decoder for decoding the coded vehicle speed command signal sensed by said second signal responsive means; and a comparator responsive to the decoded vehicle speed command signal output from said first decoder having a non-zero speed value and the decoded vehicle speed command signal output from the second decoder having a zero speed value for providing a first control signal which permits said one vehicle to travel toward said one end of said given track circuit block, and also being responsive to the decoded vehicle speed command signal output from said first decoder having a zero speed value and the decoded vehicle speed command signal output from the second decoder having a non-zero speed value for providing a second control signal which permits said one vehicle to travel toward the opposite end of said given track circuit block.

5. The combination claimed in claim 4, including:

first and second tachometers which provide respective signal outputs, which are indicative of the actual speed of said one vehicle;

a first speed regulator responsive to the signal output from said first tachometer, and the first decoded vehicle speed command signal for providing a first direction signal;

a second speed regulator responsive to the signal output from said second tachometer, and the second decoded vehicle speed command signal for providing a second direction signal;

a bistable device which is set to a first bistable state in response to the provision of said first control signal, and which is set to a second bistable state in response to the provision of said second control signal; and means responsive to one of said bistable device being in the first bistable state and the provision of said first control signal for causing said one vehicle to travel toward said one end of said given track circuit block, and said bistable device being in the second bistable state and the provision of said second control signal for causing said one vehicle to travel toward said other end of said given track circuit block.

6. A method of controlling the direction of travel of at least one vehicle in a vehicle control system, said system having a vehicle travel path which is divided into a plurality of signal conductive vehicle control blocks, said method comprising the steps of:

introducing a first vehicle speed command signal, which may have a zero speed or non-zero speed value, into one end of a given vehicle control block;

introducing a second vehicle speed command signal, which may have a zero speed or non-zero speed value, into the other end of said given vehicle control block; and responding to one of said one vehicle sensing said first vehicle speed command signal having a non-zero speed value and said second vehicle speed command signal having a zero speed value for automatically permitting said one vehicle to travel toward said one end of said given vehicle control block, and said one vehicle sensing said first vehicle speed command signal having a zero speed value and said second vehicle speed command signal having a non-zero speed value for automatically permitting said one vehicle to travel toward said other end of said given vehicle control block.

7. A method of controlling the direction of travel of at least one vehicle in a vehicle control system, said system having a conductive track including a pair of conductive rails, with said track being divided into a plurality of signal conductive track circuit blocks, said method comprising the steps of:

introducing a first vehicle speed command signal, which may have a zero speed or non-zero speed value, into the rails at one end of a given track circuit block;

introducing a second vehicle speed command signal, which may have a zero speed or non-zero speed value, into the rails at the other end of said given track circuit block; and responding to one of said one vehicle sensing said first vehicle speed command signal having a non-zero speed value and said second vehicle speed command signal having a zero speed value for automatically permitting said one vehicle to travel toward said one end of said given track circuit block, and said one vehicle sensing said first vehicle speed command signal having a zero speed value and said second vehicle speed command signal having a non-zero speed value for automatically permitting said one vehicle to travel toward said other end of said given track circuit block.

* * * * *